United States Patent
Duffield et al.

(10) Patent No.: US 9,571,366 B2
(45) Date of Patent: Feb. 14, 2017

(54) METHOD AND APPARATUS FOR DETECTING AND LOCALIZING AN ANOMALY FOR A NETWORK

(75) Inventors: Nicholas Duffield, Summit, NJ (US); Paul Barford, Madison, WI (US); Amos Ron, Madison, WI (US); Joel Sommers, Hamilton, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1418 days.

(21) Appl. No.: 12/647,537

(22) Filed: Dec. 27, 2009

(65) Prior Publication Data
US 2011/0158105 A1    Jun. 30, 2011

(51) Int. Cl.
*G06F 11/00* (2006.01)
*H04L 12/26* (2006.01)
*H04L 12/24* (2006.01)

(52) U.S. Cl.
CPC ...... *H04L 43/0852* (2013.01); *H04L 43/0823* (2013.01); *H04L 43/10* (2013.01); *H04L 43/16* (2013.01); *H04L 41/5003* (2013.01)

(58) Field of Classification Search
USPC ............. 370/216, 225, 235, 241, 242, 245, 248,370/252, 254; 709/223, 224, 226
See application file for complete search history.

(56) References Cited

U.S. PATENT DOCUMENTS

| | | |
|---|---|---|
| 6,430,160 B1 * | 8/2002 | Smith et al. ............ 370/252 |
| 7,945,678 B1 * | 5/2011 | Skene ...................... 709/227 |
| 2006/0126495 A1 * | 6/2006 | Guichard et al. ........ 370/216 |
| 2007/0177518 A1 * | 8/2007 | Li et al. ................... 370/252 |

* cited by examiner

*Primary Examiner* — Yemane Mesfin
*Assistant Examiner* — Mon Cheri Davenport (57) ABSTRACT

A method and apparatus for detecting and localizing an anomaly for a network are disclosed. For example, the method sends a first set of probe packets on at least one path of the network, and detects a performance anomaly on a first path of the at least one path. The method then identifies at least one link on the first path that is responsible for the performance anomaly by applying a second set of probe packets.

19 Claims, 3 Drawing Sheets

METHOD AND APPARATUS FOR DETECTING AND LOCALIZING AN ANOMALY FOR A NETWORK

The present disclosure relates generally to communications networks and, more particularly, to a method and apparatus for detecting and localizing a performance anomaly for a network, e.g., a packet network, an Internet Protocol (IP) network, and the like.

BACKGROUND

A customer may request a network service provider to guarantee the performance of one or more network services. For example, the service provider and the customer may detail the level of network performance for a service to be received by the customer in a Service Level Agreement (SLA). For example, a SLA may detail transport level service assurances for a service using performance parameters such as: frequency of loss events, duration of loss events, packet loss rates, delay, delay variation, jitter, etc. Failing to meet a SLA guarantee may result in a service disruption for the customer. In addition, the failure to meet a SLA guarantee may result in a loss of revenue for the customer and/or the network service provider.

The service provider may perform compliance monitoring to ensure that SLA targets are met. Thus, detecting the occurrence and location of performance anomalies (e.g., high jitter or loss events) is important to ensuring the effective operation of network infrastructures. However, monitoring and detecting meaningful events in huge infrastructures with high bandwidth links where normal traffic behavior can be highly dynamic presents serious challenges.

SUMMARY

In one embodiment, the present disclosure discloses a method and apparatus for detecting and localizing an anomaly for a network. For example, the method sends a first set of probe packets on at least one path of the network, and detects a performance anomaly on a first path of the at least one path. The method then identifies at least one link on the first path that is responsible for the performance anomaly by applying a second set of probe packets.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure describes a method and apparatus for detecting and localizing an anomaly for a network, e.g., a packet network, an Internet Protocol (IP) network, and the like. For example, the present disclosure describes a method for detecting an observed network performance anomaly and then localizes the anomaly to at least one link of a path in the network.

Figure 1:
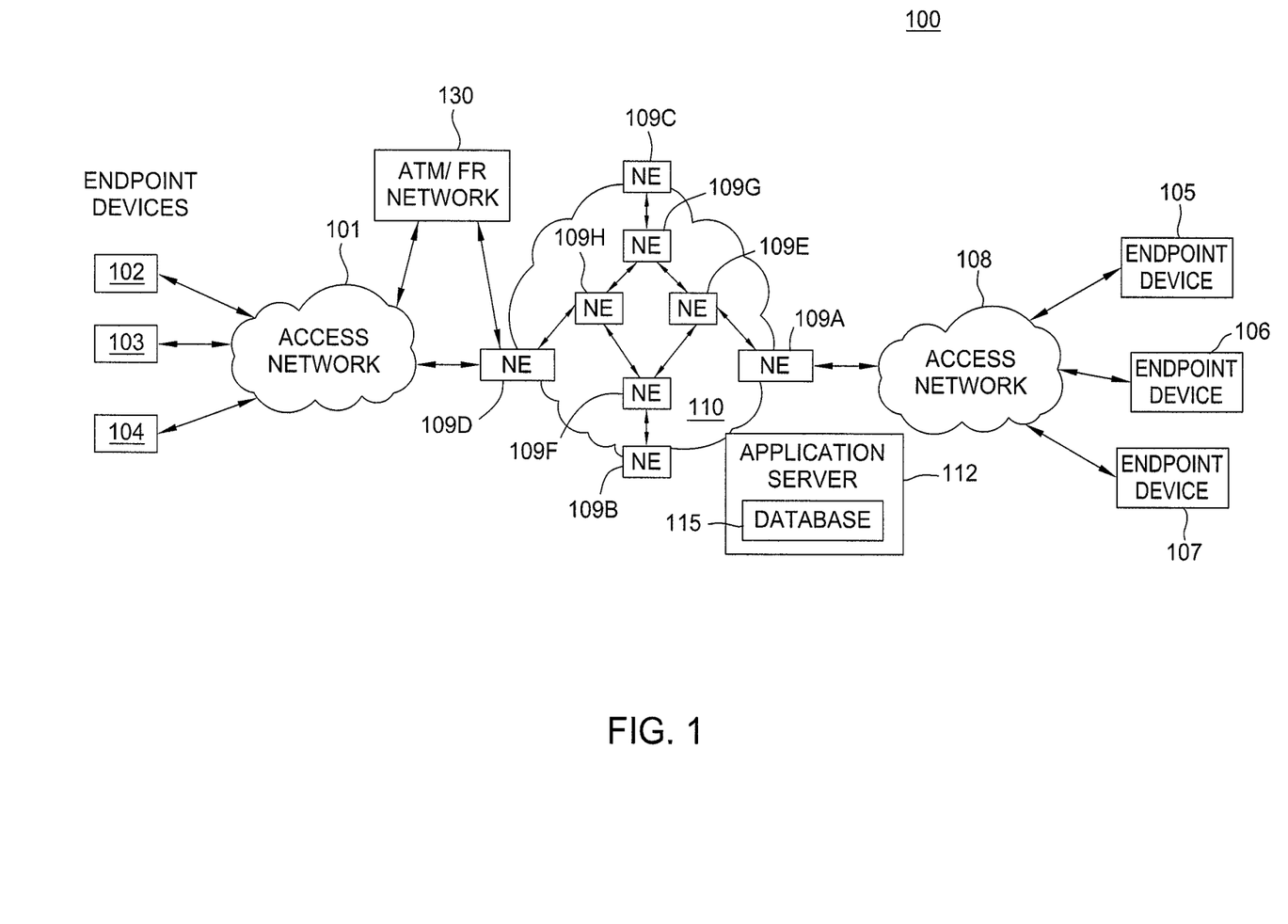
FIG. 1 illustrates an illustrative network related to the current disclosure.

FIG. 1 illustrates an exemplary packet network 100 related to the current disclosure. Exemplary packet networks include Internet protocol (IP) networks, Internet Protocol (IP) Multimedia Subsystem (IMS) networks, Asynchronous Transfer Mode (ATM) networks, frame-relay networks, wireless networks, and the like. An IP network is broadly defined as a network that uses Internet Protocol such as IPv4 or IPv6 and the like, to exchange data packets. It should be noted that the present disclosure is not limited to a particular type of network.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements (NEs) 109a-d may serve as gateway servers or edge routers for the network 110.

The endpoint devices 102-107 may comprise customer endpoint devices such as personal computers, laptop computers, Personal Digital Assistants (PDAs), mobile phones, smart phones, servers, routers, and the like. The access networks 101 and 108 serve as a conduit to establish a connection between the endpoint devices 102-107 and the NEs 109a and 109d of the IP core network 110. The access networks 101 and 108 may each comprise a Digital Subscriber Line (DSL) network, a broadband cable access network, a Local Area Network (LAN), a Wireless Access Network (WAN), and the like.

The access networks 101 and 108 may be either directly connected to NEs 109a and 109d of the IP core network 110 or through an Asynchronous Transfer Mode (ATM) and/or Frame Relay (FR) switch network 130. If the connection is through the ATM/FR network 130, the packets from customer endpoint devices 102-104 (traveling towards the IP core network 110) traverse the access network 101 and the ATM/FR switch network 130 and reach the border element 109d.

The ATM/FR network 130 may contain Layer 2 switches functioning as Provider Edge Routers (PERs) and/or Provider Routers (PRs). The PERs may also contain an additional Route Processing Module (RPM) that converts Layer 2 frames to Layer 3 Internet Protocol (IP) frames. An RPM enables the transfer of packets from a Layer 2 Permanent Virtual Connection (PVC) circuit to an IP network which is connectionless.

Some NEs (e.g., NEs 109a-d) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 109e-h) and may be used as a mail server, honeypot, a router, or like device. The IP core network 110 may also comprise an application server 112 that contains a database 115. The application server 112 may comprise any server or computer that is well known in the art, and the database 115 may be any type of electronic collection of data that is also well known in the art. It should be noted that although only six endpoint devices, two access networks, eight network elements, one application server are depicted in FIG. 1, the communication network 100 may be expanded by including any number of additional endpoint devices, access networks, network elements, application servers without altering the scope of the present disclosure.

In one embodiment, the network service provider may implement the current method for detecting and localizing an anomaly for a network in an application server 112. For example, the application server 112 implements one or more methods or algorithms for detecting and localizing an anomaly for a network as further described below.

The above communication network is described to provide an illustrative environment in which packets for voice, data and multimedia services are transmitted on networks. In one embodiment, the network service provider and the customer may specify the network performance level for a network used to transport packets for the customer in a Service Level Agreement (SLA). For example, the SLA may detail transport level service assurances using various network performance parameters. For example, the SLA may provide minimum performance targets for frequency of loss events, duration of loss events, packet loss rates, delay, delay variation, jitter, etc.

The network service provider may then perform compliance monitoring to determine if the performance parameters are meeting the minimum performance targets. In one embodiment, the compliance monitoring includes a method for detecting and localizing an anomaly for a network. For example, the packets from and/or to the customer may traverse over various paths, where each path is formed by multiple links. In one embodiment, the present disclosure describes a method for detecting an observed network performance anomaly and then localizes the anomaly to at least one link of a path in the network.

It should be noted that although the present disclosure is disclosed in the context of a single service provider, the present disclosure is not so limited. Namely, the present disclosure can be adapted to the end-to-end monitoring through multiple networks owned by different service providers.

In one embodiment, an active measurement is performed by injecting one or more measurement probes (or referred to as probe packets). For example, a measurement probe refers to one or more packets sent on an end-to-end path. For example, one or more packets may be injected to measure the end-to-end delay or jitter for customer traffic traversing a network. As such, probes are not actual customer data of a customer.

In one embodiment, the present disclosure broadly discloses a method and apparatus for detecting and localizing an anomaly for a network. To better understand the present disclosure, the following networking terminology will first be provided:

Probe;
Path;
Packet loss rate;
Delay; and
Delay Variation.

A probe refers to one or more packets sent on a path. For example, a delay measurement probe may be sent from a source to a destination to determine the delay being experienced by packets in traversing the network from the source to the destination. It should be noted that various systems can be used to send or receive probes, e.g., general purpose computers or NEs (e.g., switches, routers, and the like).

A path is broadly defined as a set of links between two nodes, where a node can be a network element, e.g., a router, a switch, a gateway, and the like.

Packet loss rate refers to the total number of lost packets divided by the total number of transmitted packets on a given path (consisting of one or more links) over a specified time interval. For example, if one packet is lost out of 1000 packets sent in one second, the packet loss rate is 0.001 per second.

Delay refers to the duration of time between when a packet is sent by an origination device and when the packet is received by a destination device. For example, a delay may be the time a packet takes to travel from the origination device to the destination device.

Delay Variation refers to a measurement of the variation of delay experienced by multiple packets. For example, if two packets are sent one second apart and they reach the destination at one second apart, then the delay variation is zero. However, if the packets are received 1.1 seconds apart (in the order sent), then there is a delay variation in the network. Delay variation is sometimes referred to as a jitter.

In one embodiment, the present disclosure describes a framework for monitoring, detecting, and localizing performance anomalies in a network. For example, the framework can be implemented where a set of active measurement systems (broadly network elements) is deployed around the edges of the network (e.g., implemented directly in routers, switches, gateways, and the like), where probes sent between these systems can cover all links of interest in the network.

In one embodiment, the framework comprises a method or component for detecting performance anomalies on an individual path, where a path is defined as the set of links between two measurement nodes. For example, the method uses active probing in conjunction with performance thresholds specified in SLAs. When a threshold is exceeded (i.e., an anomaly is detected or observed), an alarm is raised, e.g., a report or a notification message can be sent.

In one embodiment, the framework comprises a method or component for path selection for performance anomaly detection that determines which path(s) should be probed at a given point in time. Objectives of this method include ensuring that all links in the network are frequently probed in order to quickly detect anomalies, while limiting probing overhead. This method is iterative and associates weights with links such that the weight $w_i$ associated with a link i increases over time if it is not on a path chosen for probing during a given time interval. This increase in weight results in an increased probability that a path containing that link will be probed in the near future. One aspect of the present method is to enable a tradeoff between the volume of probe traffic and the frequency of probing on individual links, and by extension the timeliness of detection.

In one embodiment, the framework comprises a method or component for providing localization that enables efficient identification of the link that is responsible for the anomalous behavior. This method is triggered when a performance anomaly is detected on a path. For example, this method iteratively selects additional path(s) to probe that will maximally increase information regarding the location of an anomaly. In one embodiment, conditioning the selection of a new path to probe such that it overlaps half of the current set of links with uncertain state optimally increases, on average, the information about the location of an observed anomaly as further described below. It should be noted that although in one embodiment the newly selected path is conditioned to overlap approximate one half of the length of the current set of links on a path, the present disclosure is not so limited. In other words, other lengths can be selected as well.

In one embodiment, the present approach considers the network as a directed multigraph G=(V, E). The directed network is considered because one may want to label the edge with values (e.g., failure status, congestion) that depend on the direction of traffic flow. A multigraph is considered because one may want to distinguish multiple links between two nodes (e.g., composite links in which an IP layer link is realized by operating several physical links in parallel). Along with G comes a set of routes R, which for each ordered pair (u, v) ⊂ V specifies a subset R(u, v) ⊂ R of paths that join from u to v. It is assumed there is at least one route r(u, v) from each u to each v. It is also assumed that the set R does not change during detection and localization.

In one embodiment, a subset W ⊂ V of nodes will be the measurement nodes. Each measurement node can act as a source or a sink of probes, although it need not perform both functions. In this disclosure, it is assumed that each measurement node is a leaf node in the network. That is, there is only one edge incident on a measurement node. It is assumed there is some subset F ⊂ E of edges, in the sense that when a problem affecting packet transmission occurs on a link in F, the method wishes to become aware that an anomaly exists and determines its location. It should be noted that the various assumptions that are presented above and below are intended to simplify the present disclosure for ease of understanding and should not be interpreted as a limitation of the present method.

In one embodiment, the general approach of the present framework is to proceed in two phases. During the first phase, the method probes the network using the paths between the measurement nodes in W to detect performance anomalies. In this disclosure, it is assumed an intradomain network setting in which the routes between the nodes in W are known, and in particular that the links traversed (covered) by those paths are known. During the detection phase, one goal is to quickly detect anomalies on any link(s) residing on all paths between nodes in W. That is, the probing paths must cover (over some time period) all links in F.

Once an anomaly has been detected, the present approach initiates a localization phase in an attempt to identify the link(s) responsible for the detected or observed performance anomaly. In one embodiment, the localization is accomplished through active probing. Thus, one goal is to, as quickly as possible, determine the link(s) on which the performance anomaly is located while limiting the bandwidth used for additional probing.

In one embodiment, the determination that some anomaly exists, may be provided to the method from some external systems. This information may specify that one or more anomalies exist in some network region, or on some subset set of network paths. The anomaly localization method would then be applied only to this subset of paths.

In one embodiment, for the detection and localization phases time proceeds through a series of intervals, the length t of which is matched to the probing methodology employed. For example, t might be set such that a reasonable bound on measurement accuracy can be obtained. This can be selectively set by a service provider.

In one embodiment, the present method determines which paths to probe during the detection phase. For example, to each link i∈F, the method assigns a static importance weight $W_i$. As the method proceeds, a dynamic current link weight $w_i$ is calculated. Each path r in the network is weighted according to the sum of the current weights of the links that comprise it. Initially, the current link weights are set to 0.

In one embodiment, the method starts by sorting all possible paths according to their weight, and probe on k paths selected randomly from the K paths with the largest weights. For example, if k=1 and the largest weight of all paths is $\overline{W}$, the method chooses one path randomly from all paths K that have weight $\overline{W}$. Once a path (or set of paths) is chosen, the method sends probes (broadly referred to as a first set of probes) along each of those paths in an effort to detect performance anomalies.

Once probing during the current time interval has completed, the method sets to 0 the current weights on all links of paths that were checked. For links that were not probed, the current weight $w_i$ is updated as:

$$w_i = \min\left(W_i, w_i + \frac{W_i}{(N-1)/k}\right),$$

where N is the total number of paths in the network that can be probed. Thus, the current weight $w_i$ of a link varies between 0 and the importance (maximum) weight for that link $W_i$. The heuristic here is that by visiting a certain link, the method reduces the weight of all paths that utilize that link. However, the weight of those paths rises as time proceeds. Note that the importance weight $W_i$ of a given link may be set based, e.g., on knowledge of important traffic flows, in order to induce more or less frequent probing on the link. For simplicity, one can set these importance weights to 1.

It should be noted that the present method does not guarantee that, during a given probing interval, links are covered at most once. In particular, with k>1, it is indeed possible for links to be probed by multiple measurement nodes simultaneously during a given probing interval. In one embodiment, the method selects k paths with the highest weights in a given time interval that do not have any (unidirectional) links in common.

In one embodiment, network anomaly detection is based on the approach of identifying significant deviations from the normal state. Thus, in one embodiment, the method establishes or determines a normal state of an end-to-end path with active probes, and then subsequently detects when the conditions on that path are sufficiently different from normal to raise an alarm.

In one embodiment, once a path has been selected, a series of probe packets is sent along the path (according to any probing methodology), over a given time interval. The result of probing a single path is a set of one-way measurements. For example, one goal is to label the links of a path as being in an anomalous state (e.g., "condition red"), nearly in an anomalous state (e.g., "condition yellow"), or functioning normally (e.g., "condition green"). In one embodiment, the method requires a user, e.g., a network service provider, to specify thresholds for what is anomalous (maximum values for delay/jitter/loss) and nearly anomalous (relative to maximum) for measurement on a given path. This provides an implicit definition of normal for each path characteristic and has implications for deployment such as obviating the need to apply complex signal analysis to measurements.

In one embodiment, once a performance anomaly has been detected on a path during the detection phase, the localization phase is initiated in order to find the link(s) responsible for the observed or detected anomaly. To illustrate the problem, consider again the topology in FIG. 1. Even in such a simple topology, a set of paths that covers all links during the detection phase may not enable immediate localization of an observed anomaly. Please note that paths below will be described in view of the topology of NE 109a-h, where 109a is "A", and 109b is "B" and so on. For example, given probing along the paths (A,E,G,H,D), (B,F, H,G,C), (A,E,F,B) (plus the reverse paths) and an anomaly observed only on path (A,E,G,H,D), one can immediately eliminate the links (A,E), (G,H) since these links lie on anomaly-free paths. However, one cannot narrow the location of the anomaly any further than {(E,G), (H,D)} without additional probing or information.

In one embodiment, given that a performance anomaly has been detected, the method conditions on an anomaly having been detected on some maximal subset R" of measurement paths (maximal in that it contains all potentially problematic paths). One may then attempt to find the minimal set of nodes N' such that there is a set of paths Q between nodes in N' for which measurements on Q suffice to locate the problematic link(s) within R".

In one embodiment, measurement can then be done on one of the set of paths in Q. The result of this probing can be used to condition a subsequent set of possible measurements. Each additional measurement gives rise to a new version of the conditioning problem. Note that this occurs whether or not the path measurement finds an anomaly; an outcome of no problem observed on a newly measured path may provide sufficient information to locate the remaining anomalous links.

In one embodiment, given the current state of knowledge of the network (e.g., some set of paths exhibits an anomaly) the next measurement path should be chosen in order to maximize the mutual information between the current and new knowledge. In one illustrative example, it is assumed that a single path exhibits an anomaly. The present method aims to select an intersecting path in order to maximize the mutual information. In one embodiment, the method employs a state-counting approach to locating a single anomalous link on a path. For example, the method attempts to choose a second path to partially intersect the first path. In one embodiment, when anomalies are rare, approximately half the first path should be overlapped by the second. One aspect to the analysis is the conditioning on the existence of a performance anomaly on the first path.

Consider a path of n links which are labeled 1, 2, . . . , n. Suppose that end-to-end measurement along the path has indicated a performance anomaly on the path. For simplicity, it is assumed that only one link is problematic. This is reasonable when the probability of any link anomaly is very small. If it is assumed that links are independently problematic, then conditioned on at least one link being problematic, it is overwhelmingly likely that only one link is problematic. It is also assumed that each link has an equal chance to exhibit a performance anomaly.

In one embodiment, the method considers a state of the path to specify for each link whether it is problematic or not. Conditioned on the path being problematic, in the above model there are n possible states (one for each link to be problematic). The number of possible states represents the uncertainty in the location of the anomaly. The aim of the localization measurement is to minimize this uncertainty.

Suppose one supplements the initial measurement that revealed a performance anomaly with a second measurement from the source along the subpath (1, 2, . . . , m) for m<n. One approach is to choose m in order to minimize the number of possible states compatible with the information received in the second measurement.

In one embodiment, the method minimizes the average number of possible states after the second measurement. For example, the method assumes that the anomaly is persistent, i.e., the second measurement is subject to the same observed link problems as the first.

Suppose the original problem lies along subpath (1, 2, . . . , m). This happens with probability $p_-=m/n$ since links are equally likely to exhibit an anomaly. Assuming the anomaly lies on one of the first m links, there are $N_-=m$ possible states remaining. In the alternative case, the anomaly was in the subpath (m+1, . . . , n), with probability $p_+=(n-m)/n$, corresponding to $N_+=(n-m)$ states. Hence the average number of possible states after the second measurement is:

$$p_-N_- + p_+N_+ = \frac{m^2 + (n-m)^2}{n},$$

which is minimized when m=n/2. Thus, in one embodiment, the second measurement should encompass half the problematic path.

The localization method is now described. Suppose that during the most recent detection phase interval, the method probes the paths $r_i$, i∈1 . . . k. Call this set of paths D. It is assumed that the method observes a performance anomaly on at least one path; call this set of paths D'⊆D. Initially, the set of paths in D' constitutes the current hypothesized location of the anomaly. Denote the hypothesized location of the anomaly as H. Note that as the method narrows the location of the observed anomaly, links will be removed from H. Thus, one can consider H to be a set of partial paths, or path segments. Now, if k>1, the method may be able to immediately narrow the location of an observed anomaly. First, if it is assumed that there is a single anomaly, the method can reduce H to the set of path segments common to all paths in H. Next, the method can remove links on which the method did not observe an anomaly (i.e., links on paths in D-D') from path segments in H.

At this point, the method employs the path selection analysis as discussed above to select one or more of paths for additional probing in order to further reduce H. That is, a path to probe for localization is chosen such that the overlap between the new path and a path segment $h_i$∈H is as close as possible to half the length of $h_i$. Furthermore, if H consists of more than one path segment, the method may probe more than one path during a given interval in the localization phase as long as the paths do not overlap.

Depending on the result of probing along the new path(s), the set of path segments in H will decrease. If H has been reduced to one segment consisting of a single link, the localization method terminates. Otherwise, a new overlapping path is chosen such that it has not yet been probed during the localization phase. If all paths that overlap path segments in H have been probed, the localization method terminates and reports H as the best possible estimate of the anomaly location. Note that depending on probe monitor placement and network topology, it may not be possible to localize a given anomaly to a single link.

Figure 2:
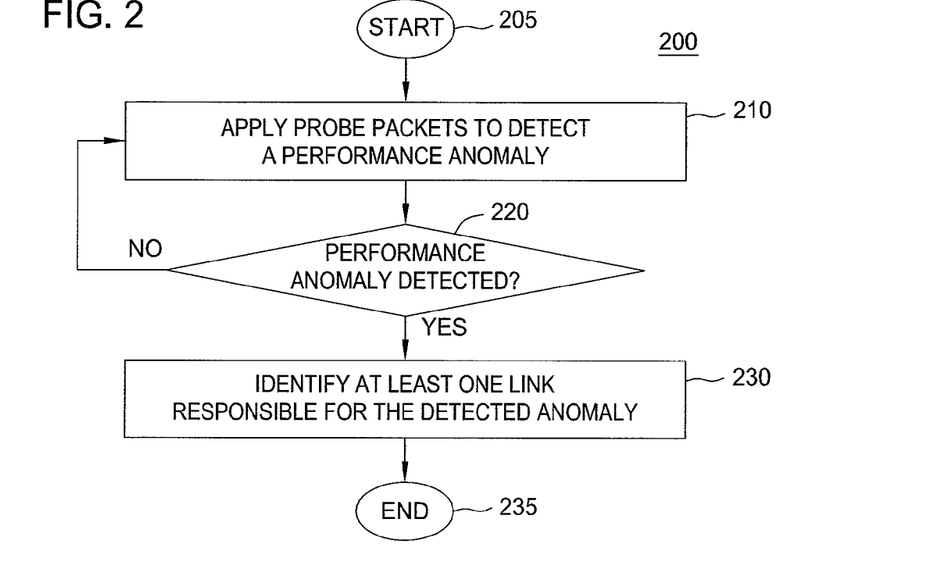
FIG. 2 illustrates a flowchart of a method for detecting and localizing an anomaly for a network.
Figure 4:
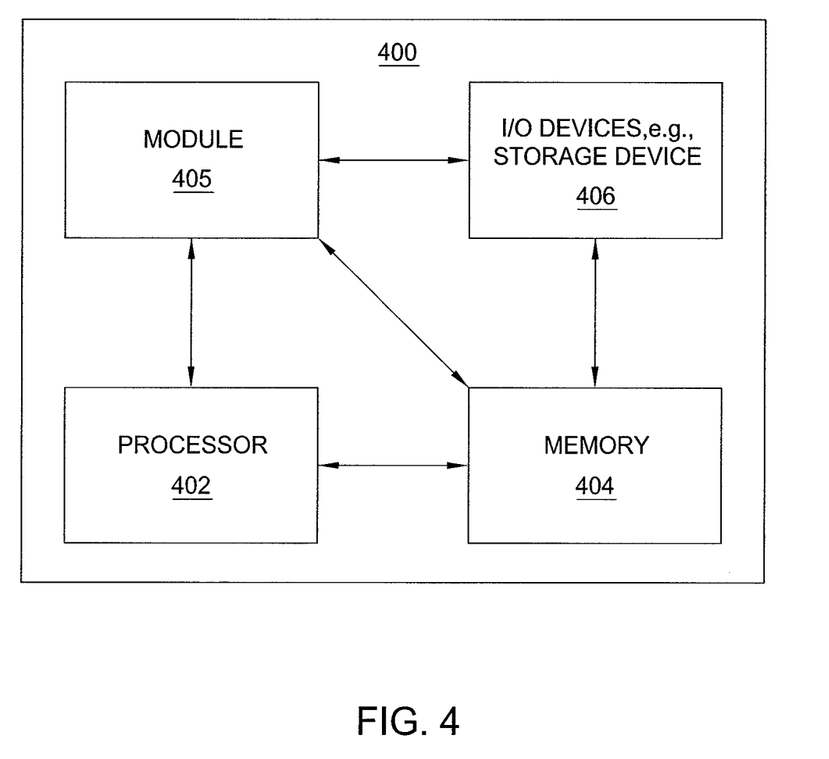
FIG. 4 illustrates a high level block diagram of a general purpose computer suitable for use in performing the functions described herein.

FIG. 2 illustrates a flowchart of a method 200 for detecting and localizing an anomaly for a network. For example method 200 can be implemented by application server 112 or a general purpose computer 400 as illustrated in FIG. 4 below. Method 200 starts in step 205 and proceeds to step 210.

In step 210, method 200 applies one or more probe packets (broadly referred to as a first set of probes) to one or more paths to detect a performance anomaly. As discussed above, the probe packets can be implemented to measure various performance parameters such as frequency of loss events, duration of loss events, packet loss rates, delay, delay variation, and/or jitter.

In step 220, the method 200 determines whether a performance anomaly has been detected. As discussed above, one or more thresholds can be predefined, e.g., in accordance with SLAs or actual measurements of the network during normal operation, for each of the various performance parameters. For example, if any one of the thresholds is exceeded, then method 200 will deem that a performance anomaly has been detected or observed on at least one path of the network and proceeds to step 230. If none of the thresholds is exceeded, then method 200 will deem that a performance anomaly has not been detected or observed on at least one path of the network and returns to step 210 to continue to select other paths to apply probe packets. In one embodiment, as discussed above, the selection of the next path(s) for probing is performed based on the weight of the paths. It should be noted that the thresholds may not need to be static. For example, the threshold can be dynamically set, e.g., based on time series information.

In step 230, method 200 applies a localization method to identify at least one link that is responsible for the detected anomaly. In one embodiment, the method actively applies one or more probe packets (broadly referred to as a second set of probes) to identify at least one link that is responsible for the detected anomaly. A detailed description of the localization method is described below in FIG. 3. Method 200 ends in step 235.

Figure 3:
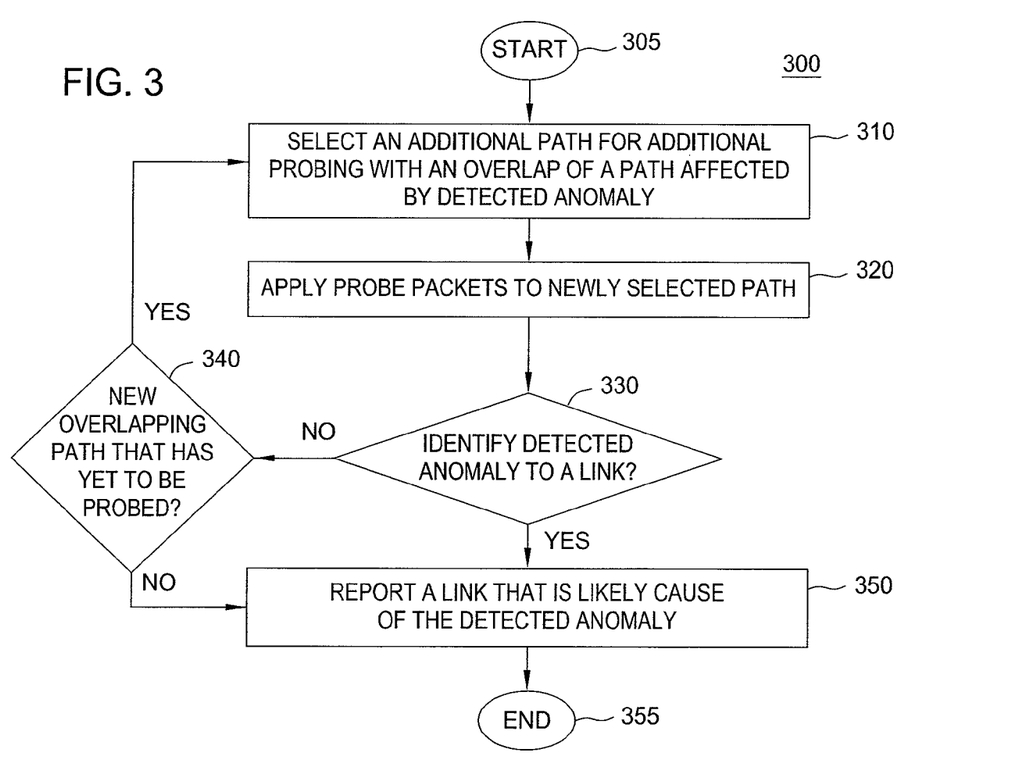
FIG. 3 illustrates a flowchart of a method for localizing an anomaly for a network.

FIG. 3 illustrates a flowchart of a method 300 for localizing an anomaly for a network. For example method 300 can be implemented by the application server 112 or a general purpose computer 400 as illustrated in FIG. 4 below. Method 300 starts in step 305 and proceeds to step 310.

In step 310, method 300 selects an additional path (broadly a second path) to apply additional probing with one or more probe packets. In one embodiment, the newly selected path overlaps with at least one path, i.e., a problematic path (broadly a first path) where a performance anomaly has been detected or observed. For example, the newly selected path overlaps the problematic path as close as possible to half the length of the problematic path.

In step 320, the method 300 applies the one or more probe packets to the newly selected path.

In step 330, the method 300 determines whether the additional information received by applying the probe packets to the newly selected path allows for the isolation of the anomaly to a link. If the query in step 330 is answered negatively, the method proceeds to step 340. If the query in step 330 is answered positively, the method proceeds to step 350.

In step 340, the method 300 determines whether there is any overlapping path with the problematic path that has yet to be probed. If the query in step 340 is answered negatively, the method proceeds to step 350. If the query in step 340 is answered positively, the method proceeds to step 310 where another new overlapping path is selected.

In step 350, the method 300 reports a link that is likely the cause of the detected performance anomaly. For example, the report can be sent as an alarm message to a network monitoring system, or a trouble ticket system of a network service provider. In one embodiment, the service provider may then send a report to the affected customer(s) impacted by the identified link. If a particular link cannot be isolated, then method 300 will report the best possible estimate of the anomaly location. The method ends in step 355.

It should be noted that although not specifically specified, one or more steps of methods 200 and 300 may include a storing, displaying and/or outputting step as required for a particular application. In other words, any data, records, fields, and/or intermediate results discussed in the methods 200 and 300 can be stored, displayed and/or outputted to another device as required for a particular application. Furthermore, steps or blocks in FIGS. 2, and 3 that recite a determining operation, or involve a decision, do not necessarily require that both branches of the determining operation be practiced. In other words, one of the branches of the determining operation can be deemed as an optional step.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for detecting and localizing an anomaly for a network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for detecting and localizing an anomaly for a network can be loaded into memory 404 and executed by processor 402 to implement the functions as discussed above. As such, the present process 405 for detecting and localizing an anomaly for a network (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting a performance anomaly for a network, the method comprising:

sending, by a processor, a first set of probe packets on a first path of the network;

detecting, by the processor, a first indication of the performance anomaly on the first path, wherein the first indication of the performance anomaly on the first path is detected via the first set of probe packets;

selecting, by the processor, a second path of the network that only partially intersects a portion of the first path, wherein the second path includes a link that is not on the first path;

sending, by the processor, a second set of probe packets on the second path, wherein the selecting and the sending are performed in response to the detecting the first indication of the performance anomaly on the first path;

detecting, by the processor, a second indication of the performance anomaly on the second path, wherein the second indication of the performance anomaly on the second path is detected via the second set of probe packets; and identifying, by the processor, a link that is on both the first path and on the second path that is responsible for the performance anomaly.

2. The method of claim 1, wherein the portion comprises approximately one half of a length of the first path.

3. The method of claim 1, wherein the first path comprises an end-to-end path.

4. The method of claim 1, wherein the performance anomaly is associated with a performance parameter comprising: a delay parameter, a delay variation parameter, a packet loss rate parameter, a frequency of loss event parameter, or a duration of loss event parameter.

5. A method for detecting a performance anomaly for a network, the method comprising:

sending, by a processor, a first set of probe packets on a first path of the network;

detecting, by the processor, a first indication of the performance anomaly on the first path, wherein the performance anomaly is associated with a performance parameter comprising a delay variation parameter, wherein the delay variation parameter comprises a variation in a time difference between two probe packets when the two probe packets are sent, and a time difference between the two probe packets when the two probe packets are received;

sending, by the processor, a second set of probe packets on a second path of the network that only partially intersects a portion of the first path, wherein the sending is performed in response to the detecting the first indication of the performance anomaly on the first path, wherein the second path includes a link that is not on the first path;

detecting, by the processor, a second indication of the performance anomaly on the second path, wherein the second indication of the performance anomaly on the second path is detected via the second set of probe packets; and identifying, by the processor, a link that is on both the first path and the second path that is responsible for the performance anomaly.

6. The method of claim 1, further comprising:

reporting the link that is on both the first path and the second path as a likely cause to the performance anomaly.

7. The method of claim 1, wherein the sending the first set of probe packets on the first path comprises choosing the first path for applying the first set of probe packets based on a weight assigned to the first path.

8. A method for detecting a performance anomaly for a network, the method comprising:

sending, by a processor, a first set of probe packets on a first path of the network, wherein the sending the first set of probe packets on the first path comprises choosing the first path for applying the first set of probe packets based on a weight assigned to the first path, wherein the first path has a higher weight and is selected first over another path that has a lower weight;

detecting, by the processor, a first indication of the performance anomaly on the first path, wherein the first indication of the performance anomaly on the first path is detected via the first set of probe packets;

sending, by the processor, a second set of probe packets on a second path of the network that only partially intersects a portion of the first path, wherein the sending is performed in response to the detecting the first indication of the performance anomaly on the first path, wherein the second path includes a link that is not on the first path;

detecting, by the processor, a second indication of the performance anomaly on the second path, wherein the second indication of the performance anomaly on the second path is detected via the second set of probe packets; and identifying, by the processor, a link that is on both the first path and the second path that is responsible for the performance anomaly.

9. The method of claim 8, where a weight of a path that is not selected for a predefined time interval is increased upon an expiration of the predefined time interval.

10. A non-transitory computer-readable medium storing instructions which, when executed by a processor, cause the processor to perform operations for detecting a performance anomaly for a network, the operations comprising:

sending a first set of probe packets on a first path of the network;

detecting a first indication of the performance anomaly on the first path, wherein the first indication of the performance anomaly on the first path is detected via the first set of probe packets;

selecting a second path of the network that only partially intersects a portion of the first path, wherein the second path includes a link that is not on the first path;

sending a second set of probe packets on the second path, wherein the selecting and the sending are performed in response to the detecting the first indication of the performance anomaly on the first path;

detecting a second indication of the performance anomaly on the second path, wherein the second indication of the performance anomaly on the second path is detected via the second set of probe packets; and identifying a link that is on both the first path and the second path that is responsible for the performance anomaly.

11. The non-transitory computer-readable medium of claim 10, wherein the portion comprises approximately one half of a length of the first path.

12. The non-transitory computer-readable medium of claim 10, wherein the first path comprises an end-to-end path.

13. The non-transitory computer-readable medium of claim 10, wherein the performance anomaly is associated with a performance parameter comprising: a delay parameter, a delay variation parameter, a packet loss rate parameter, a frequency of loss event parameter, or a duration of loss event parameter.

14. A non-transitory computer-readable medium storing instructions which, when executed by a processor, cause the processor to perform operations for detecting a performance anomaly for a network, the operations comprising:

sending a first set of probe packets on a first path of the network;

detecting a first indication of the performance anomaly on the first path, wherein the performance anomaly is associated with a performance parameter comprising a delay variation parameter, wherein the delay variation parameter comprises a time difference between two probe packets when the two probe packets are sent, and a time difference between the two probe packets when the two probe packets are received;

sending a second set of probe packets on a second path of the network that only partially intersects a portion of the first path, wherein the sending is performed in response to the detecting the first indication of the performance anomaly on the first path, wherein the second path includes a link that is not on the first path;

detecting a second indication of the performance anomaly on the second path, wherein the second indication of the performance anomaly on the second path is detected via the second set of probe packets; and identifying a link that is on both the first path and the second path that is responsible for the performance anomaly.

15. The non-transitory computer-readable medium of claim 10, further comprising:

reporting the link that is on both the first path and the second path as a likely cause to the performance anomaly.

16. The non-transitory computer-readable medium of claim 10, wherein the sending the first set of probe packets on the first path comprises choosing the first path for applying the first set of probe packets based on a weight assigned to the first path.

17. A non-transitory computer-readable medium storing instructions which, when executed by a processor, cause the processor to perform operations for detecting a performance anomaly for a network, the operations comprising:

sending a first set of probe packets on a first path of the network, wherein the sending the first set of probe packets on the first path comprises choosing the first path for applying the first set of probe packets based on a weight assigned to the first path, wherein the first path has a higher weight and is selected first over another path that has a lower weight;

detecting a first indication of the performance anomaly on the first path, wherein the first indication of the performance anomaly on the first path is detected via the first set of probe packets;

sending a second set of probe packets on a second path of the network that only partially intersects a portion of the first path, wherein the sending is performed in response to the detecting the first indication of the performance anomaly on the first path, wherein the second path includes a link that is not on the first path;

detecting a second indication of the performance anomaly on the second path, wherein the second indication of the performance anomaly on the second path is detected via the second set of probe packets; and identifying a link that is on both the first path and the second path that is responsible for the performance anomaly.

18. An apparatus for detecting a performance anomaly for a network, the apparatus comprising:

a processor; and a computer-readable medium storing instructions which, when executed by the processor, cause the processor to perform operations, the operations comprising:

sending a first set of probe packets on a first path of the network;

detecting a first indication of the performance anomaly on the first path, wherein the first indication of the performance anomaly on the first path is detected via the first set of probe packets;

selecting a second path of the network that only partially intersects a portion of the first path, wherein the second path includes a link that is not on the first path;

sending a second set of probe packets on the second path, wherein the selecting and the sending are performed in response to the detecting the first indication of the performance anomaly on the first path;

detecting a second indication of the performance anomaly on the second path, wherein the second indication of the performance anomaly on the second path is detected via the second set of probe packets; and identifying a link that is on both the first path and the second path that is responsible for the performance anomaly.

19. The non-transitory computer-readable medium of claim 17, where a weight of a path that is not selected for a predefined time interval is increased upon an expiration of the predefined time interval.

* * * * *